United States Patent Office 3,708,485
Patented Jan. 2, 1973

3,708,485
2-(N-ALLYL-PHENYLAMINO)-IMIDAZOLINES-(2) AND SALTS THEREOF
Helmut Stahle, Herbert Koppe, Werner Kummer, and Helmut Wick, Ingelheim am Rhein, Germany, assignors to Boehringer Ingelheim GmbH, Ingelheim am Rhein, Germany
No Drawing. Filed Nov. 12, 1970, Ser. No. 88,982
Claims priority, application Germany, Nov. 19, 1969,
P 19 58 201.5
Int. Cl. C07d 49/34
U.S. Cl. 260—254      21 Claims

ABSTRACT OF THE DISCLOSURE

Compounds of the formula

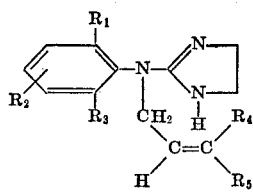

wherein $R_1$ is hydrogen, chlorine, methyl, ethyl, methoxy or trifluoromethyl,
$R_2$ is hydrogen, chlorine, bromine, fluorine, methyl, methoxy or cyano,
$R_3$ is hydrogen, chlorine, methyl or ethyl, and
$R_4$ and $R_5$ are each hydrogen, methyl or chlorine, provided, however, that $R_1$, $R_2$ and $R_3$ are other than all hydrogen at the same time and that $R_4$ and $R_5$ are other than both chlorine at the same time, and their non-toxic, pharmacologically acceptable acid addition salts; the compounds as well as their salts are useful as analgesics and hypotensives.

---

This invention relates to novel 2-(N-allyl-phenylamino)-imidazolines-(2) and non-toxic acid addition salts thereof, as well as to various methods of preparing these compounds.

More particularly, the present invention relates to a novel class of 2-(N-allyl-phenylamino)-imidazolines-(2) of the formula

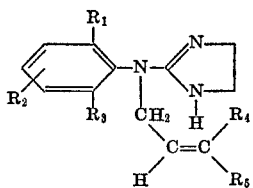

wherein $R_1$ is hydrogen, chlorine, methyl, ethyl, methoxy or trifluoromethyl,
$R_2$ is hydrogen, chlorine, bromine, fluorine, methyl, methoxy or cyano,
$R_3$ is hydrogen, chlorine, methyl or ethyl, and
$R_4$ and $R_5$ are each hydrogen, methyl or chlorine, provided, however, that $R_1$, $R_2$ and $R_3$ are other than all hydrogen at the same time and that $R_4$ and $R_5$ are other than both chlorine at the same time, and their non-toxic, pharmacologically acceptable acid addition salts.

Within the generic class of compounds represented by Formula I, a preferred sub-genus is represented by the formula

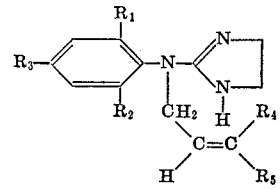

wherein $R_1$, $R_2$, $R_3$, $R_4$ and $R_5$ have the same meanings as in Formula I, and non-toxic, pharmacologically acceptable acid addition salts thereof, and especially preferred are compounds of the formula

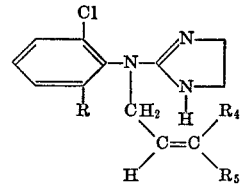

wherein $R_4$ and $R_5$ have the same meanings as in Formula I and R is chlorine or methyl, and non-toxic, pharmacologically acceptable acid addition salts thereof.

The compounds of the Formula I may be prepared by the following methods:

Method A

By reacting a 2-phenylamino-imidazoline-(2) of the formula

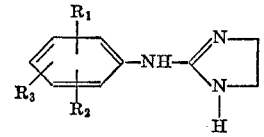

wherein $R_1$, $R_2$ and $R_3$ have the same meanings as in Formula I, with an allyl halide of the formula

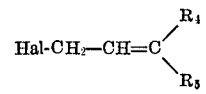

wherein $R_4$ and $R_5$ have the same meanings as in Formula I and Hal is chlorine, bromine or iodine.

Method B

By reacting a compound of the formula

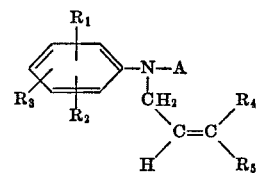

wherein $R_1$, $R_2$, $R_3$, $R_4$ and $R_5$ have the same meanings as in Formula I and
A is cyano or

where Y is alkoxy of 1 to 4 carbon atoms, alkylthio of 1 to 4 carbon atoms, sulfhydryl or amino, with ethylenediamine or an acid addition salt thereof.

The reaction in either of these methods is advantageously carried out by heating the reactants to a temperature between about 50 and 150° C. and in the presence of an inert organic solvent, if needed. The most advantageous specific reaction conditions depend largely upon the reactivity of the individual reactants and are most advantageously determined by preliminary tests.

In method A the allyl-halide of the Formula III is preferably provided in excess over the stoichiometrically required amount, and the reaction is advantageously carried out in the presence of an acid-binding agent.

In method B it is advantageous to provide the ethylenediamine or an acid addition salt thereof, such as the p-toluenesulfonate, in excess over the stoichiometrically required amount.

In method A the alkylation takes place exclusively at the nitrogen bridge atom, which can be proven by means of NMR-spectroscopy; in case of substitution at the nitrogen bridge atom the methylene protons of the imidazoline ring appear as a singulet at about 6 p.p.m. ($\tau$-scale).

In method B the structure of the end product is fixed by the synthesis.

The 2-(N-allyl-phenylamino)-imidazolines-(2) defined by Formula I are organic bases and therefore form acid addition salts with inorganic or organic acids. Such addition salts may be prepared in conventional manner, that is, for example, by dissolving the free base in a solvent, and acidifying the solution with the desired acid. Examples of nontoxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, valeric acid, capronic acid, oxalic acid, malonic acid, succinic acid, glutaric acid, maleic acid, fumaric acid, lactic acid, tartaric acid, citric acid, malic acid, benzoic acid, p-hydroxybenzoic acid, phthalic acid, cinnamic acid, salicyclic acid, ascorbic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

2-[N-(2',6'-dichloro-phenyl)-N-allyl-amino]-imidazoline-(2) by method A

A mixture consisting of 2.0 gm. of 2-(2',6'-dichloro-phenyl-amino)-imidazoline-(2), 3 ml. of allyl bromide, 1 ml. of pyridine and 10 ml. of absolute methanol was heated for about 15 hours at 100° C. in a closed tube. Thereafter, the reaction mixture was evaporated to dryness in vacuo, the residue was dissolved in a small amount of dilute hydrochloric acid, the resulting solution was purified by extraction with ether, and the ether extracts were discarded. The acidic aqueous solution was made alkaline with 5 N sodium hydroxide whereupon an oily substance separated out which crystallized through upon standing for some time on an ice bath. The crystalline product was collected by vacuum filtration, washed with distilled water and dried. 1.5 gm. (83% of theory) of the compound of the formula

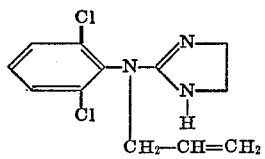

having a melting point of 130–131° C. were obtained. Its nitrate had a melting point of 136–138° C.

Using a procedure analogous to that described above, the following compounds were also prepared.

(a) 2 - [N-(2',5'-dichloro-phenyl) - N - allyl-amino]-imidazoline-(2) from 2-[(2',3'-dichloro-phenyl)-amino]-imidazoline-(2) and allyl bromide. The yield was 63.4% of theory. Its nitrate had a melting point of 142–144° C.

(b) 2-[N-(2'-methyl - 5' - chloro-phenyl)-N-allyl-amino]-imidazoline of the formula

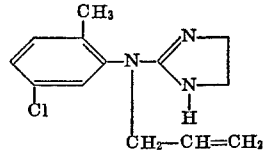

from 2 - [(2'-methyl-5'-chloro-phenyl)-amino]-imidazoline-(2) and allyl bromide. The yield was 36% of theory. Its nitrate had a melting point of 111–113.5° C.

(c) 2 - [N - (2',3' - dichloro-phenyl)-N-allyl-amino]-imidazoline-(2) from 2-[(2',3'-dichloro-phenyl)-amino]-imidazoline-(2) and allyl bromide. The yield was 47.8% of theory. Its nitrate had a melting point of 173.5–174.5° C.

(d) 2-[N-(2'-chloro - 3' - methyl-phenyl)-N-allyl-amino]-imidazoline-(2) from 2-[(2'-chloro-3'-methyl-phenyl)-amino]-imidazoline-(2) and allyl bromide. The yield was 56.3% of theory. Its nitrate had a melting point of 95–96° C.

EXAMPLE 2

2-[N-(2',6'-dichloro-phenyl)-N-crotyl-amino]-imidazoline-(2) and its nitrate by method A A mixture consisting of 5 gm. of 2-[(2',6'-dichloro-phenyl)-amino]-imidazoline-(2), 7.5 ml. of 1-bromo-2-butene and 25 ml. of glycol monomethyl ether was heated for 10 hours at 100° C. in a closed tube. Thereafter, the reaction mixture was evaporated to dryness in vacuo, the residue was taken up in dilute hydrochloric acid, and the solution was fractionally extracted with ether at different pH-values. The thin-layer chromatographically uniform extracts, which contained the free base 2-[N-(2',6'-dichloro-phenyl) - N - crotylamino]-imidazoline-(2), were combined, dried over magnesium sulfate, treated with activated charcoal, and acidified with concentrated nitric acid. 4.7 gm. (71.9% of theory) of a white crystalline precipitate, M.P. 141–143° C., were formed which was identified to be the nitrate of the base of the formula

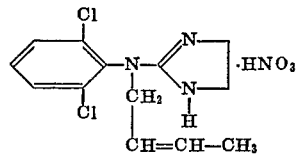

Using an analogous procedure, the following compounds were also prepared:

(a) 2-[N-(2',3'-dichloro-phenyl) - N - crotyl-amino]-imidazoline-(2) from 2-[(2',3'-dichloro-phenyl)-amino]-imidazoline-(2) and 1-bromo-2-butene. The yield was 35.5% of theory. Its oxalate had a melting point of 144–145° C.

(b) 2-[N-(2'-chloro-4'-methyl - phenyl) - N - crotyl-amino]-imidazoline-(2) from 2-[(2' - chloro - 4' - methyl-phenyl)amino] - imidazoline-(2) and 1-bromo-2-butene. The yield was 11.3% of theory. Its oxalate had a melting point of 119–120° C.

EXAMPLE 3

2-[N-(2',6'-dichloro-phenyl)-N-(-cis-chloroallyl)-amino]-imidazoline-(2) by method A A mixture consisting of 28.3 gm. (0.123 mol) of 2-[(2',6'-dichloro-phenyl)-amino] - imidazoline - (2), 20.4 gm. (1.5 × 0.123 mol) of cis-1,3-dichloropropene-2 (B.P. 103° C. at 761 mm. Hg), 14.3 gm. (1.1 × 0.123 mol) of sodium carbonate and 100 ml. of n-butanol was refluxed for six hours; at the end of this time the reaction had practically gone to completion. Thereafter, the reaction mixture was evaporated to dryness in vacuo, and the residue was taken up in 1 N hydrochloric acid. The resulting clear, yellow acidic solution was extracted several times with ether (the ethereal extracts were discarded) and then purified with activated charcoal. The solution was then fractionally extracted with ether at gradually increasing pH-values, the pH adjustment being made with 1 to 2 N sodium hydroxide. The ethereal extract solution which contained the desired cis-compound were combined, dried over magnesium sulfate and evaporated to dryness in vacuo, leaving 24 gm. (64.2% of theory) of 2-[N-(2',6'-dichloro-phenyl)-N-(cis - chloroallyl)-amino]-imidazoline-(2), M.P. 115.5–117° C., of the formula

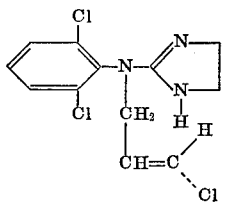

Using an analogous procedure, the following compounds were also prepared:

(a) 2-[N-(2'-chloro - 4' - methyl-phenyl) - N - (cis-chloroallyl)-amino]-imidazoline-(2), M.P. 104–105° C., from 2-[(2'-chloro-4'-methyl-phenyl)-amino] - imidazoline-(2) and cis-1,3-dichloropropene-(2). The yield was 31.7% of theory.

(b) 2-[N-(2'-methyl-4'-chloro-phenyl)-N-(cis - chloroallyl)-amino]-imidazoline - (2), M.P. 102–104° C., from 2-[(2'-methyl-4'-chloro-phenyl)-amino] - imidazoline-(2) and cis-1,3-dichloropropene-2. The yield was 57.4% of theory.

(c) 2-[N-(2' - chloro-6'-methyl-phenyl)-N-(cis-chloroallyl)amino]-imidazoline-(2), M.P. 100–102° C., from 2-[(2'-chloro-6-methyl-phenyl)-amino] - imidazoline-(2) and cis-1,3-dichloropropene-2. The yield was 43.4% of theory.

(d) 2-[N-(2',4' - dichloro-phenyl)-N-(cis-chloroallyl)-amino]-imidazoline-(2), M.P. 109–110° C., from 2-[(2',4'-dichloro-phenyl)-amino]-imidazoline-(2) and cis-1,3-dichloropropene-2. The yield was 48.3% of theory.

(e) 2 - [N-(2',6'-diethyl-phenyl)-N-(cis-chloroallyl)-amino]-imidazoline-(2), an oil of the formula

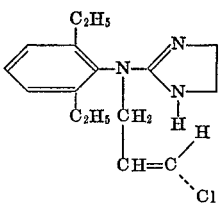

from 2-[(2',6'-diethyl-phenyl)-amino]-imidazoline - (2) and cis - 1,3 - dichloropropene-2. The yield was 60.5% of theory.

EXAMPLE 4

2-[N-(2'-chloro-4'-methyl-phenyl)-N-(trans-chloroallyl)-amino]-imidazoline-(2) by method A A mixture consisting of 8.35 gm. (0.04 mol) of 2-[2'-chloro-4'-methyl-phenyl)-amino] - imidazoline - (2), 7.5 ml. of trans-1,3-dichloropropene-2 (B.P. 112.1° C. at 764 mm. Hg) and 50 ml. of absolute methanol was heated for 16 hours at 100° C. in a closed tube. Thereafter, the reaction solution was evaporated to dryness in vacuo, and the residue was taken up in 1 N hydrochloric acid. The clear acidic solution was buffered with 2 N sodium hydroxide and then fractionally extracted with ether at gradually increasing pH-values. Those ethereal extracts which contained the desired free base in pure form (determination by thin-layer chromatogram: $R_f$-value in the system benzene:dioxane:ethanol:ammonia=50:40:5:5 is smaller than that of the imidazoline starting compound) were combined, dried over magnesium sulfate and evaporated in vacuo, leaving 3.5 gm. (30.8% of theory) of 2-[N-(2'-chloro-4'-methyl-phenyl) - N - (trans - chloroallyl)amino]-imidazoline-(2), M.P. 116–117° C.

Using an analogous procedure, the following compounds were also prepared:

(a) 2-[N-(2',6'-dichloro-phenyl) - N - (trans-chloroallyl)-amino]-imidazoline-(2), M.P. 131–133° C., from 2-[(2',6'-dichloro-phenyl)-amino] - imidazoline-(2) and trans-1,3-dichloropropene-2. The yield was 24.2% of theory.

(b) 2-[N-(2'-chloro-6'-methyl-phenyl) - N-(trans-chloroallyl)-amino]-imidazoline - (2), M.P. 110–112.5° C., from 2-[(2'-chloro-6'-methyl-phenyl) - amino]-imidazoline-(2) and trans-1,3-dichloropropene-2. The yield was 48.2% of theory.

(c) 2-[N-(2'-methyl - 4'-chloro - phenyl)-N-(trans-chloroallyl)-amino]-imidazoline-(2) from 2-[(2'-methyl-4'-chlorophenyl)-amino]-imidazoline-(2) and trans-1,3-dichloropropene-2. The yield was 41.5% of theory. Its hydrochloride had a melting point of 175–176° C.

EXAMPLE 5

2-[N-(2',6'-dichloro-phenyl)-N-(3'',3''-dimethylallyl)amino]-imidazoline-(2) by method A A mixture consisting of 9.2 gm. of 2-[(2',6'-dichlorophenyl)-amino]-imidazoline-(2), 7.5 ml. of 3,3-dimethylallyl chloride and 50 ml. of absolute methanol was heated for 12 hours at 100° C. in a closed tube. Thereafter, the reaction mixture was evaporated to dryness in vacuo, the residue was taken up in 1 N hydrochloric acid, and the resulting solution was fractionally extracted with ether at different, gradually increasing pH-values. The ethereal extracts which contained the desired free base in pure form were combined, dried over magnesium sulfate and evaporated in vacuo, leaving 4.0 gm. (33.5% of theory) of an initially oily product which crystallized throughout after a short time and then had a melting point of 79–80° C. It was identified to be the compound of the formula

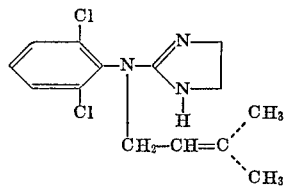

Using an analogous procedure, 2-[N-(2'-chloro-4'-methyl-phenyl)-N - (3'',3''-dimethylallyl) - amino]-imidazoline-(2), M.P. 81° C., was prepared from 2-[2'-chloro-4'-methyl-phenyl)-amino]-imidazoline-(2) and 3,3-dimethylallyl chloride. The yield was 18% of theory.

EXAMPLE 6

Using a procedure analogous to that described in Example 1, 2-[N-(2',6'-dichloro-4'-bromo-phenyl)-N-allyl-amino]-imidazoline-(2), M.P. 170.5–173.5° C., of the formula

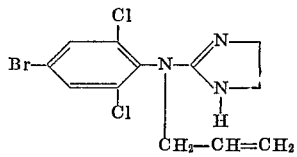

was prepared from 2-[(2',6'-dichloro-4'-bromo-phenyl)-amino]-imidazoline-(2) and allyl chloride. The yield was 52.6% of theory.

EXAMPLE 7

Using a procedure analogous to that described in Example 1, 2-[N-(4'-cyano-phenyl)-N-allyl-amino]-imidazoline-(2), M.P. 117.5–120.5° C., of the formula

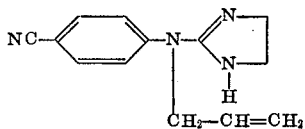

was prepared from 2-[(4'-cyano-phenyl)-amino]-imidazoline-(2) and allyl chloride. The yield was 42.3% of theory.

EXAMPLE 8

Using a procedure analogous to that descrbied in Example 1, 2-[N-(2',6'-diethyl-phenyl)-N-allyl-amino]-imidazoline-(2), was prepared from 2-[(2',6'-diethyl-phenyl)-amino]-imidazoline-(2) and allyl chloride. The yield was 36.3% of theory.

EXAMPLE 9

Using a procedure analogous to that described in Example 1, 2-[N-(2'-trifluoromethyl-phenyl)-N-allyl-amino]-imidazoline-(2), M.P. 90–92° C., of the formula

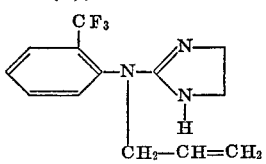

was prepared from 2-[(2' - trifluoromethyl-phenyl)-amino]-imidazoline-(2) and allyl chloride. The yield was 59.5% of theory.

EXAMPLE 10

Using a procedure analogous to that described in Example 1, 2-[N-(4'-fluoro-phenyl)-N-allyl-amino]-imidazoline-(2), an oil, of the formula

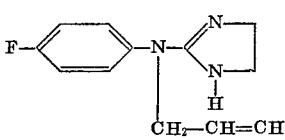

was prepared from 2-[(-4'-fluoro-phenyl)-amino]-imidazoline-(2) and allyl chloride. The yield was 46.4% of theory.

EXAMPLE 11

Using a procedure analogous to that described in Example 1, 2-[N-(2',5'-dimethoxy - phenyl)-N-allyl-amino]-imidazoline-(2), M.P. 73–75° C., of the formula

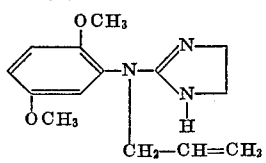

was prepared from 2-[(2',5'-dimethoxy-phenyl)-amino]-imidazoline-(2) and allyl chloride. The yield was 55.8% of theory.

The compounds according to the present invention, that is, those embraced by Formula I above and their nontoxic, pharmacologically acceptable acid addition salts, have useful pharmacodynamic properties. More particularly, the compounds of the instant invention exhibit analgesic and hypotensive activities in warm-blooded animals, such as mice, rats and rabbits.

For pharmaceutical purposes the compounds according to the present invention are administered to warm-blooded animals perorally, enterally or parenterally, preferably perorally, as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective oral dosage unit of the compounds according to the present invention is from 0.00166 to 1.34 mgm./kg. body weight, preferably 0.0166 to 0.5 mgm./kg. body weight.

The following examples illustrate a few dosage unit compositions comprising a compound of the present invention as an active ingredient and represent the best mode contemplated of putting the invention into practical use. The parts are parts by weight unless otherwise specified.

EXAMPLE 12

The tablet composition was compounded from the following ingredients:

| | Parts |
|---|---|
| 2 - [N - (2',6' - dichloro-phenyl)-N-crotyl-amino]-imidazoline-(2) nitrate | 10 |
| Lactose | 65 |
| Corn starch | 125 |
| Secondary calcium phosphate | 40 |
| Soluble starch | 3 |
| Magnesium stearate | 3 |
| Colloidal silicic acid | 4 |
| Total | 250 |

Preparation: The imidazoline compound was intimately admixed with the lactose, the corn starch, the calcium phosphate and the silicic acid, the mixture was thoroughly kneaded with an aqueous 10% solution of the soluble starch, and the resulting moist mass was granulated through a 1.5 mm.-mesh screen and dried. The granulate was admixed with the magnesium stearate, and the resulting composition was compressed into 250 mgm.-tablets which were then coated with a thin shell consisting essentially of a mixture of sugar and talcum. Each coated tablet contained 10 mgm. of the imidazoline compound and, when administered perorally to a warm-blooded animal of about 60 kg. body weight in need of such treatment, produced very effective analgesic and hypotensive actions.

EXAMPLE 13

Hypodermic solution

The solution was compounded from the following ingredients:

| | Parts |
|---|---|
| 2 - [N-(2',6' - dichloro-phenyl)-N-(cis-chloroallyl)-amino]-imidazoline-(2) hydrochloride | 1.0 |
| Sodium chloride | 18.0 |
| Distilled water, q.s.ad 2000.0 parts by vol. | |

Preparation: The imidazoline compound and the sodium chloride were dissolved in a sufficient amount of distilled water, the solution was diluted to the indicated volume with additional distilled water, filtered until free from suspended matter, and the filtrate was filled into 2 ml.-ampules in an atmosphere of nitrogen. The filled ampules were then sealed and sterilized for 20 minutes at 120° C. Each ampule contained 1 mgm. of the imidazoline compound, and when the contents thereof were administered intramuscularly to a warm-blooded animal of about 60 kg. body weight in need of such treatment, very effective analgesic and hypotensive actions were produced.

EXAMPLE 14

Drop solution

The solution was compounded from the following ingredients:

| | Parts |
|---|---|
| 2 - [N-(2',6' - dichloro-phenyl)-N-(3″,3″-dimethyl-allyl)-amino]-imidazoline-(2) hydroiodide | 0.02 |
| Methyl p-hydroxy-benzoate | 0.07 |
| Propyl p-hydroxy-benzoate | 0.03 |
| De-mineralized water, q.s.ad 100 parts by vol. | |

Preparation: The imidazoline compound and the p-hydroxy-benzoates were dissolved in a sufficient amount of de-mineralized water, the solution was diluted to the indicated volume with de-mineralized water, and the finished solution was filtered until clear. One ml. of the filtrate (about 20 drops) contained 0.2 mgm. of the imidazoline compound and, when administered perorally to a warm-blooded animal of about 60 kg. body weight in need of such treatment, produced very effective analgesic and hypotensive actions.

Analogous results were obtained when any one of the other imidazoline compounds embraced by Formula I or a nontoxic acid addition salt thereof was substituted for the particular imidazoline compound in Examples 12 through 14. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments and that various changes and modifications may be made without departing from the spirit of the invention or the scope of the appended claims.

We claim:

1. A compound of the formula

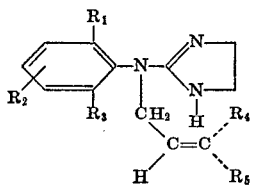

wherein
$R_1$ is hydrogen, chlorine, methyl, ethyl, methoxy or trifluoromethyl,
$R_2$ is hydrogen, chlorine, bromine, fluorine, methyl, methoxy or cyano,
$R_3$ is hydrogen, chlorine, methyl or ethyl, and
$R_4$ and $R_5$ are each hydrogen, methyl or chlorine, provided, however, that $R_1$, $R_2$ and $R_3$ are other than all hydrogen at the same time and that $R_4$ and $R_5$ are other than both chlorine at the same time, or a non-toxic, pharmacologically acceptable acid addition salt thereof.

2. A compound of the formula

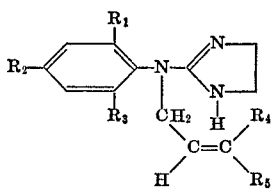

wherein
$R_1$ is hydrogen, chlorine, methyl, ethyl, methoxy or trifluoromethyl,
$R_2$ is hydrogen, chlorine, bromine, fluorine, methyl, methoxy or cyano,
$R_3$ is hydrogen, chlorine, methyl or ethyl, and
$R_4$ and $R_5$ are each hydrogen, methyl or chlorine, provided, however, that $R_1$, $R_2$ and $R_3$ are other than all hydrogen at the same time and that $R_4$ and $R_5$ are other than both chlorine at the same time, or a non-toxic, pharmacologically acceptable acid addition salt thereof.

3. A compound of the formula

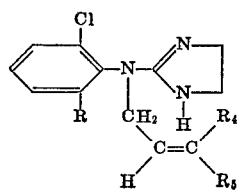

wherein
R is chlorine or methyl, and
$R_4$ and $R_5$ are each hydrogen, chlorine provided, however, that $R_4$ and $R_5$ are other than both chlorine at the same time, or methyl, or a non-toxic, pharmacologically acceptable acid addition salt thereof.

4. A compound according to claim 3, which is 2-[N-(2',6' - dichloro-phenyl)-N-allyl-amino]-imidazoline - (2) or a non-toxic, pharmacologically acceptable acid addition salt thereof.

5. A compound according to claim 3, which is 2-[N-(2',6'-dichloro - phenyl) - N - crotyl-amino]-imidazoline-(2) or a non-toxic, pharmacologically acceptable acid addition salt thereof.

6. A compound according to claim 2, which is 2-[N-(2',3'-dichloro-phenyl) - N - crotyl-amino]-imidazoline-(2) or a non-toxic pharmacologically acceptable acid addition salt thereof.

7. A compound according to claim 2, which is 2-[N-(2'-chloro-4'-methyl-phenyl) - N - crotyl-amino]imidazoline-(2) or a non-toxic, pharmacologically acceptable acid addition salt thereof.

8. A compound according to claim 3, which is 2-[N-(2',6' - dichloro-phenyl) - N - (cis- or trans-chloroallyl)-amino]-imidazoline-(2) or a non-toxic, pharmacologically acceptable acid addition salt thereof.

9. A compound according to claim 2, which is 2-[N-(2'-chloro-4'-methyl-phenyl) - N - (cis- or trans-chloroallyl)-amino]-imidazoline-(2) or a non-toxic, pharmacologically acceptable acid addition salt thereof.

10. A compound according to claim 2, which is 2-[N-(2'-methyl-4'-chloro-phenyl)-N-(cis- or trans-chloroallyl)-amino]-imidazoline-(2) or a non-toxic, pharmacologically acceptable acid addition salt thereof.

11. A compound according to claim 3, which is 2-[N-(2'-chloro-6'-methyl-phenyl) - N - (cis- or trans-chloroallyl)-amino]-imidazoline-(2) or a non-toxic, pharmacologically acceptable acid addition salt thereof.

12. A compound according to claim 2, which is 2-[N-(2',4' - dichloro-phenyl) - N - (cis-chloroallyl)-amino]-imidazoline-(2) or a non-toxic, pharmacologically acceptable acid addition salt thereof.

13. A compound according to claim 2, which is 2-[N-(2',6' - diethyl - phenyl) - N - (cis-chloroallyl)-amino]-imidazoline-(2) or a non-toxic, pharmacologically acceptable acid addition salt thereof.

14. A compound according to claim 3, which is 2-[N-(2',6' - dichloro-phenyl) - N - (3'',3'' - dimethylallyl)-amino]-imidazoline-(2) or a non-toxic, pharmacologically acceptable acid addition salt thereof.

15. A compound according to claim 3, which is 2-[N-(2'-chloro - 4' - methyl-phenyl)-N-(3'',3''-dimethylallyl)-amino]-imidazoline-(2) or a non-toxic, pharmacologically acceptable acid addition salt thereof.

16. A compound according to claim 2, which is 2-[N-(2',6'-dichloro-4'-bromo-phenyl) - N - allyl-amino]-imidazoline-(2) or a non-toxic, pharmacologically acceptable acid addition salt thereof.

17. A compound according to claim 2, which 2-[N-(4'-cyano-phenyl)-N-allyl-amino]-imidazoline-(2) or a non-toxic, pharmacologically acceptable acid addition salt thereof.

18. A compound according to claim 2, which is 2-[N-(2',6'-diethyl-phenyl) - N - allyl-amino]-imidazoline-(2) or a non-toxic, pharmacologically acceptable acid addition salt thereof.

19. A compound according to claim 2, which is 2-[N-(2' - trifluoromethyl-phenyl)-N-allyl-amino]-imidazoline-(2) or a non-toxic, pharmacologically acceptable acid addition salt thereof.

20. A compound according to claim 2, which is 2-[N-(4'-fluoro-phenyl)-N-allyl-amino]-imidazoline-(2) or a non-toxic, pharmacologically acceptable acid addition salt thereof.

21. A compound according to claim 1, which is 2-[N-(2',5'-dimethoxy-phenyl) - N - allyl-amino]-imidazoline- (2) or a non-toxic, pharmacologically acceptable acid addition salt thereof.

References Cited

UNITED STATES PATENTS
2,899,426  8/1959  Bloom ———————— 260—309.6

FOREIGN PATENTS
623,305  4/1963  Belgium ————————— 260—309.6

OTHER REFERENCES
Tronche et al.: Chem. Abst., vol. 55, column 11,396 (1961).

NATALIE TROUSOF, Primary Examiner

U.S. Cl. X.R.

260—309.6, 453 R, 465 E, 551 C, 564 E, 565; 424—273